United States Patent [19]

Tanara

[11] 4,044,161
[45] Aug. 23, 1977

[54] AUTOMATIC ICE CREAM MANUFACTURING MACHINE

[75] Inventor: Giovanni Tanara, Parma, Italy

[73] Assignee: Ice Cream Engineering di G. Tanara & C. S.a.s., Parma, Italy

[21] Appl. No.: 654,414

[22] Filed: Feb. 2, 1976

[30] Foreign Application Priority Data

Feb. 10, 1975 Italy .................................... 42505/75

[51] Int. Cl.² .............................................. A23G 9/26
[52] U.S. Cl. ........................................ 426/421; 62/72; 249/127; 425/440
[58] Field of Search ........................... 62/345, 72, 353; 425/440; 249/127, 134; 426/420, 421

[56] References Cited

U.S. PATENT DOCUMENTS

| | | | |
|---|---|---|---|
| 2,182,454 | 12/1939 | Sherman | 249/127 X |
| 2,925,052 | 2/1960 | Glass | 62/345 X |
| 3,529,430 | 9/1970 | Baverlein | 62/72 X |
| 3,580,007 | 5/1971 | Bauerlein | 62/72 X |

*Primary Examiner*—William E. Wayner
*Assistant Examiner*—William E. Tepolcain, Jr.
*Attorney, Agent, or Firm*—Brisebois & Kruger

[57] ABSTRACT

Automatic machine for manufacturing ice creams consisting of a creamy mass or ice block joined to a stick or a cone of edible biscuit material, comprises elastomer moulds deformable under cold conditions to assume two symmetrical concave and convex configurations, and the means for accomplishing said deformation.

4 Claims, 11 Drawing Figures

FIG. 5   SEZ. V-V

FIG. 6   SEZ. VI-VI

AUTOMATIC ICE CREAM MANUFACTURING MACHINE

SUMMARY OF THE INVENTION

The types of ice cream commercially available consist of an ice block formed from a sweetened aqueous coloured solution, or a mass of cream hardened at low temperature containing one or more components mixed together or kept separate and possibly coated with a shell of chocolate or other like material, and which is supported on a stick or is inserted into a cone of edible biscuit material.

This type of ice cream is manufactured at the present time by automatic machines which use metal moulds and, besides means for filling these moulds with the said materials and means for cooling the filled moulds to harden said materials, they comprise complicated means for releasing the edible ice cream mass from its mould after hardening.

Known machines which use metal moulds are understandably of complicated construction and very high cost as these moulds have to be provided, and in addition they present operational disadvantages deriving substantially from the difficulty of releasing the material from the mould.

In the first place, the shape of the edible ice cream masses obtainable from known machines is rigorously subordinate to the need for their release from the moulds, and their cross-section must therefore decrease from the mould mouth to its base.

It is not possible with known machines to obtain objects of fancy shape with one or more undercut parts.

A further grave disadvantage derives from the need to heat the metal mould before releasing the ice cream mass so that this latter may separate from the mould.

Moulds are known in which release is obtained by partially dismantling the mould, and elementary moulds, for example of hemispherical shape, are available in which release is obtained by using compressed air blown from the mould surface after heating.

In all cases the mould has to be heated to melt the surface of the ice cream mass to enable it to be separated from the mould.

This requirement leads to both operational limitations and limitations in the quality of the articles to be obtained.

Where it is required to form an ice cream mass consisting of different materials, of which one is a thin outer layer, such an ice cream mass cannot be obtained by known machines in this field, as the necessary heating prior to release would irreparably destroy and damage the outer layer or shell of the ice cream mass.

The appearance of the ice cream mass is also unsatisfactory, because the necessary heating which the mould undergoes leads to an irregular rough surface, which is not perfectly smooth and is of ugly appearance.

This prevents ice creams being obtained with a well defined fancy shape, as these are of pleasing appearance only if their surface is specular.

A further grave operational disadvantage of known machines derives from the fact that when the ice cream mass is released from the mould, the surface previously in contact with the mould is wet.

This can compromise the subsequent application of powder sprays or coatings which, because of the wet nature of the surface to which they are applied, tend to dissolve and become badly embedded in the ice cream mass.

A further grave disadvantage of known machines derives from their poor productiion flexibility. In this respect, when a large machine has been equipped to produce a certain type of ice cream, any modification of the type of production implies the replacement of complicated metal parts throughout the machine, making such a modification of the product type very uneconomical and obliging firms to provide a plurality of machines, each of which is permanently intended for the production of a certain determined type of product.

This is a grave limitation for small and medium firms, the production capacity of which does not allow more than one machine to be completely utilised, and who are therefore restricted to a certain type of product, as the production of any other type requiring the replacement of costly machine parts is uneconomical.

A further important operational limitation of known machines derives from the fact that the moulds as presently constructed are of large mass. This large mass is comparatively important if compared with the mass of ice cream to be cooled, and absorbs a large quantity of heat as it has to be cyclically heated, so constituting a barrier leading to a slowing down in the cooling of the ice cream mass contained in the mould.

It is known that the slower the cooling of a mass to low temperature, the larger the size of the ice crystals which are formed.

In the limit, with very slow cooling a mass would be obtained of poor uniformity, characterised by the presence of large crystals internally.

This disadvantage is the greater the higher the water content of the basic cream to form the final product, and prevents the use of certain types of cream.

The object of the present invention is to provide an automatic machine for manufacturing ice creams consisting of a hardened creamy mass composed of several different components which are either separate or mixed together, and which eliminates all the aforementioned disadvantages by allowing a manufacturing process, also an object of the present invention, to be carried out which greatly simplifies the art of ice cream manufacture by eliminating all those operations, such as mould heating, which form an objective limitation on the use of known machines.

These objects are attained according to the invention by machines which comprise suitable support means for a plurality of moulds, and arranged to make said moulds travel through a closed cycle, these means consisting for example of an endless conveyor belt stretched between suitable end pulleys and which has one or more portions reversed back on themselves in serpentine formation, preferably in the cooling region.

According to the invention said means support elastomer moulds locked thereon in a very simple manner, and which, supported by said means, act in combination with suitable deformation means arranged to make them assume two symmetrically opposite configurations.

Said moulds of elastomer material comprise a series of moulding cavities having walls which are comparatively very thin relative to the size of the mass to be cooled, and are deformable at the very low temperature.

This firstly enables the hardened mass to assume any shape, which may also comprise undercut parts relative to the mould, and also allows the shaped and hardened articles to be released without having to heat the mould and consequently dissolve the surface layer of the hardened mass, which once released is perfectly dry.

An important operational result of the machine and process according to the present invention is the fact that various layers of material to be kept separate from each other may be inserted into the mould, for example by spraying, and, during release of the moulded article, even the most outer layer of filling material, which may be very thin, is not damaged by the release operation.

A considerable saving in energy is possible by the invention, mainly because it is not necessary to make the moulds undergo large temperature changes, as they may be kept at a comparatively very low temperature, even during that part of the cycle which does not involve cooling means.

An important advantage of the invention lies in the fact that different ice cream shapes may be obtained on the same machine by replacing only part of the elastomer moulds which comprise them, and production is substantially continuous.

It is further evident that the elastomer moulds, which are fixed mechanically to the machine in a very simple manner and are of very low cost, may be replaced rapidly and economically as they do not comprise the means for connection to the necessary compressed air release or heating means which characterise known machines, and none of the other machine parts are strictly restricted to any one mould shape, they being able to operate with any shape thereof.

This enables smaller firms to obtain a much larger number of types of ice cream product, even with a single machine, as the replacement of the moulds is very rapid.

The advantages and operational and constructional characteristics of the invention will be more evident from the detailed description given hereinafter with reference to one preferred embodiment of the invention, illustrated in the accompanying figures by way of non-limiting example.

A machine for manufacturing ice cream cones has been illustrated for constructional simplicity and ease of description, but the same machine may serve for manufacturing ice creams of any type, either of the ice block or creamy type, by replacing the elastomer moulds, and without any further constructional modification.

Figure 1:
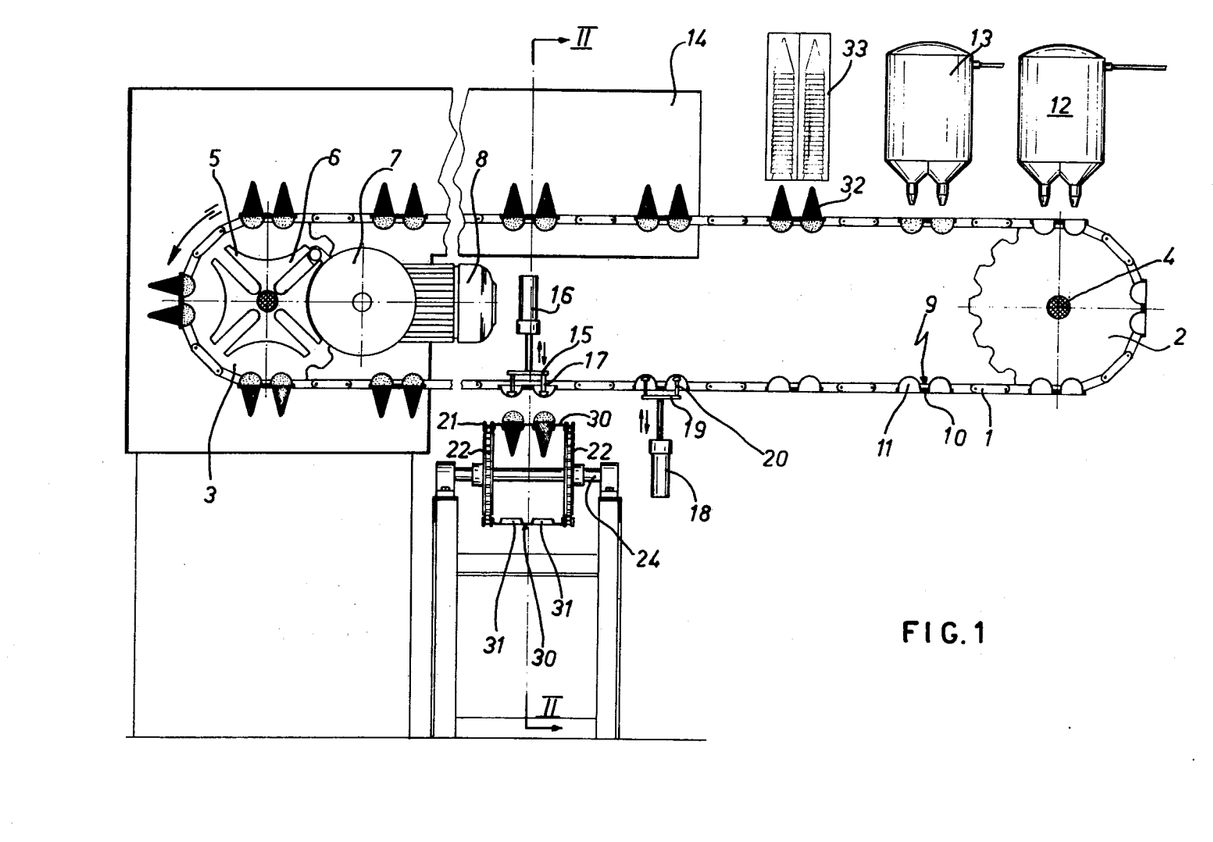
FIG. 1 is a side view of a machine constructed in accordance with the invention.
Figure 2:
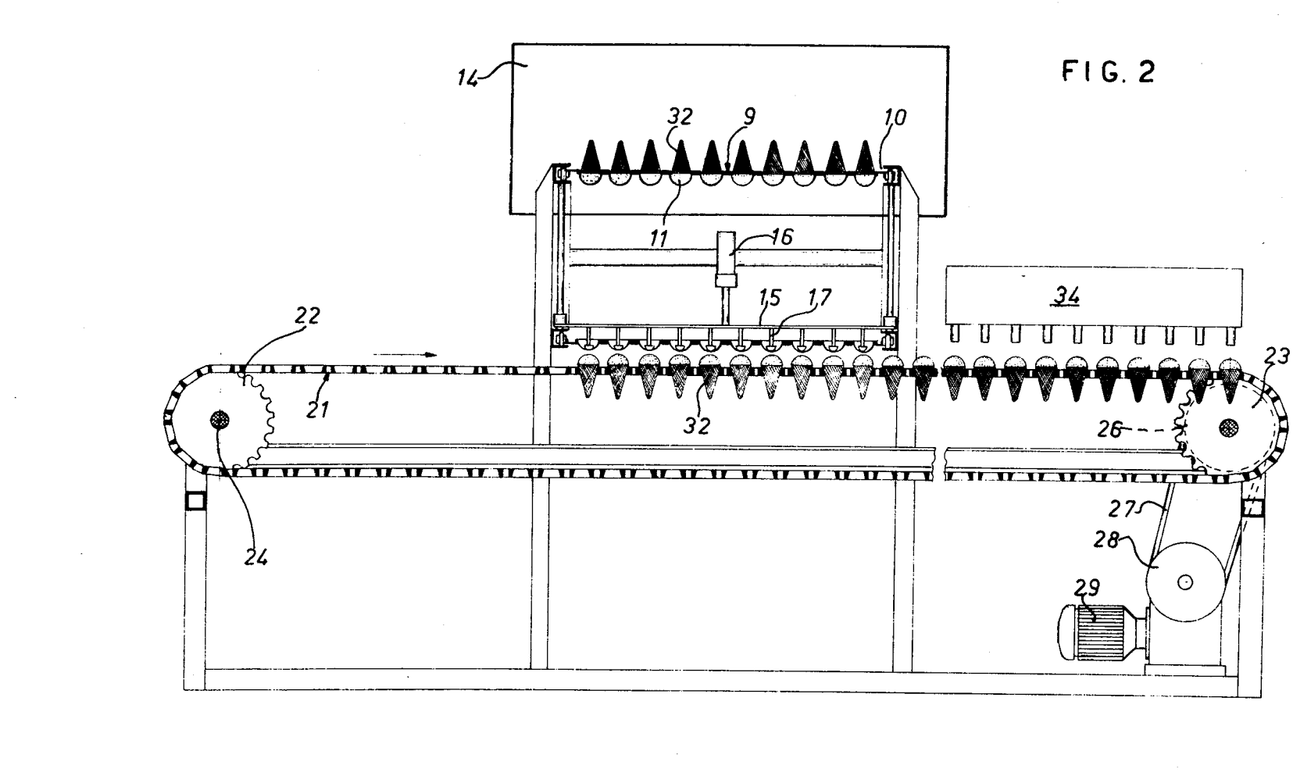
FIG. 2 is a section on the line II—II of FIG. 1.
Figure 3:
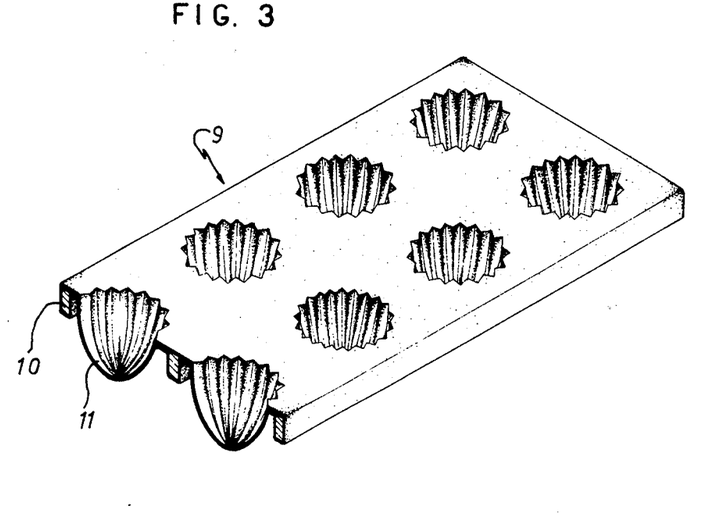
FIGS. 3 to 6 are possible shapes of moulds which may be fixed to the machines of the preceding figures.
Figure 4:
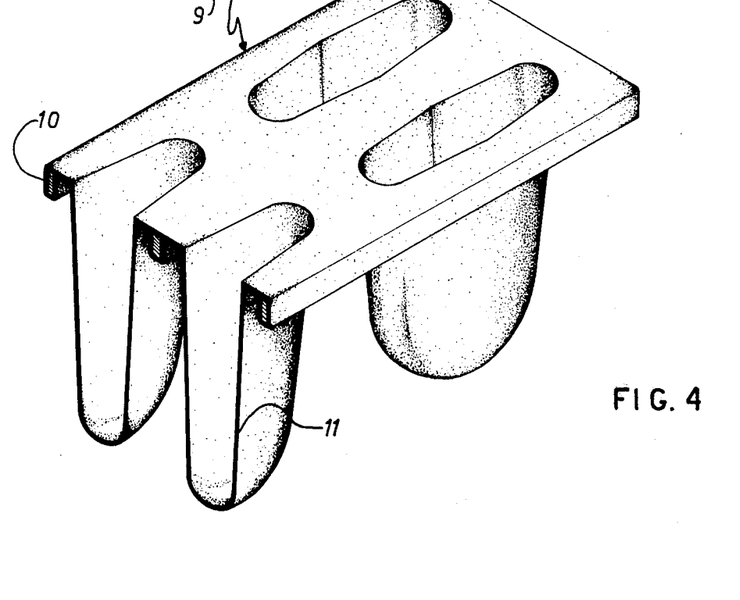
Figure 5:
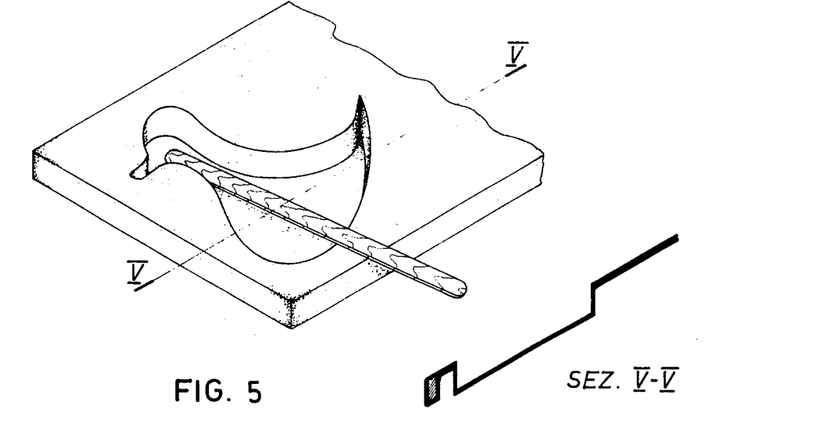
Figure 6:
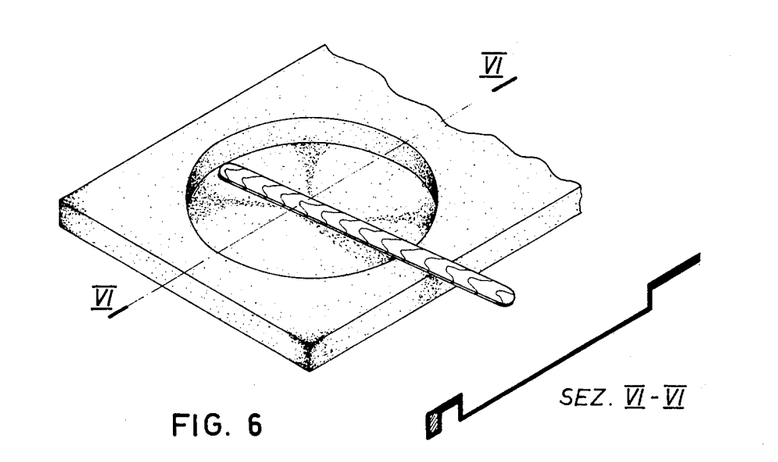
Figure 7:
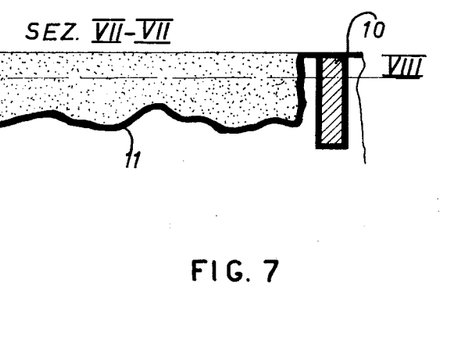
FIGS. 7 to 10 shows a general mould in its successive operating positions.
Figure 8:
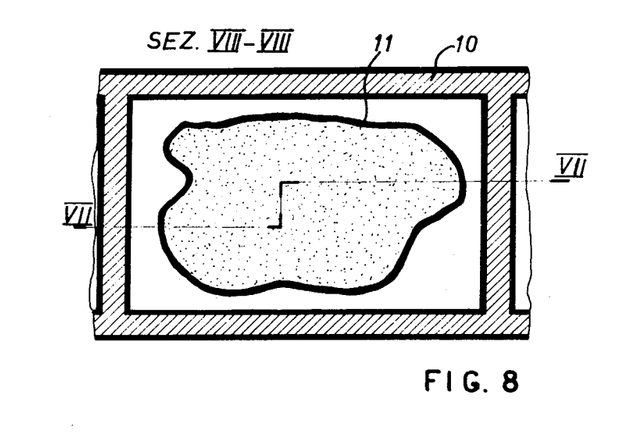
Figure 9:
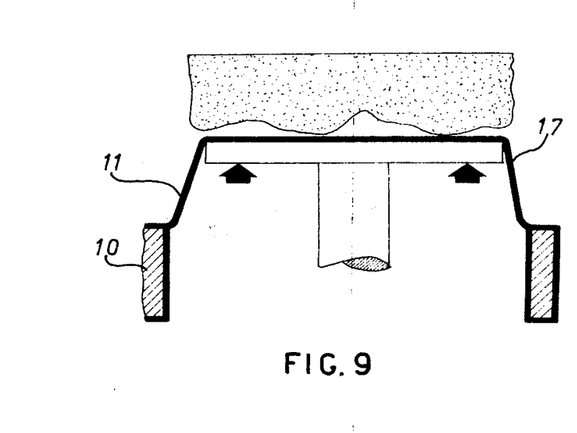
Figure 10:
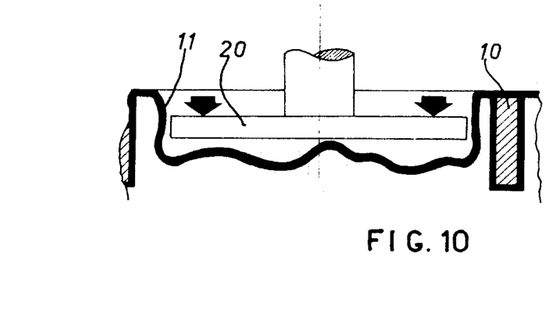

The figures show a pair of parallel chains 1 held between suitable end pinions 2 and 3.

The two pinions 2 are both supported and keyed rigidly on to one shaft 4, and the two pinions 3 are both supported and keyed rigidly on to one shaft 5.

A maltese cross device 6 is keyed on to the shaft 5 and engages in the rotating pin branching from a gear 7 engaged with a suitable drive 8.

The maltese cross device 6, 7 is arranged to drive the chains 1 through successive identical steps.

Moulds 9 each consisting of an elastomer plate 10 containing a plurality of cavities in the form of spherical cups 11 are mounted between the two chains 1.

The thickness of the cavity 11 is preferably less than the thickness of the plate 10 so as to allow the cups 11 to deform to the maximum possible extent.

The assembly comprising the gears 2 and 3 which support the chain 1 is supported by a suitable frame which is not shown in the figures for simplicity of drawing.

The cavities 11 shown in the form of spherical cups may be of any configuration, including undercut parts, as explained in the introduction to the present patent.

According to the invention, suitable means 12 are provided above the upper horizontal portion of the two chains 1 for spraying edible material in hardenable liquid form, preferably in an aqueous suspension, such as chocolate, these means coating the interior of the mould cavity 11 with a very thin layer of said material.

Downstream of said sprays, in the path of the chains 1, are positioned usual proportioning means 13 arranged to feed the desired quantity of cold-hardening cream into the moulds.

Several sets of means 13 in succession may be provided for feeding different types of material. Downstream of the means 13 for feeding the material into the mould there are usually provided means for feeding either a stick or a cone of edible biscuit material.

The case illustrated provides for feeding inverted cones 32 by a known device 33.

Immediately downsteam of the means 33, the chains 1 according to the invention enter a thermally insulated chamber 14 in which a very low temperature of the order of 40° – 45° C below zero is maintained. This chamber 14 is illustrated diagrammatically on the drawing for simplicity and its component parts are well known to experts of the art. In particular, the usual serpentine portion of the conveyor 1 is omitted from the drawing.

After travelling within the chamber 14 for a time sufficient to guarantee fixing of the cone 32 and complete hardening of the creamy material fed by the proportioning device 13, which occurs in 40 – 45 minutes, the chains 1 leave the chamber 14 and proceed to a discharge station for the final product.

The discharge station consists of a cross bar 15 from which derive plungers 17 forming part of a suitable cylinder-piston operating unit 16.

All the feed and control means for the double acting cylinder-piston unit 16, which may be pneumatic or hydraulic, are omitted as they are known and present no constructional difficulty.

The stroke of the piston 16 is equal to double the depth of the cups 11 in the moulds 9, so that as the plungers act from the outside on to the base of the cups, which are inverted in the region of the discharge station, they cause them to turn out and consequently expel the hardened cream mass together with the relative biscuit cones which fall the correct way into the cavities 31 in the underlying cross members 30.

Downsteam of the material discharge station there is a further station, the purpose of which is to reset the shape of the moulds.

This further station is analogous to the discharge station but is situated on the other side of the mould, and likewise consists of a cylinder-piston unit 18, the rod of which is engaged with a cross member 19 supporting a plurality of plungers 20 situated in positions exactly corresponding with the cups 11.

The stroke of the cylinder-piston unit 18 is exactly equal to double the depth of the cup 11 so that when the cups have been subjected to the action of the cylinder-piston unit 18, they return to their initial position ready for the next filling.

Below the discharge station, the machine illustrated comprises a transverse conveyor, better seen in FIG. 2, and consisting of two parallel chains 21 held between respective end pinions 22 and 23 keyed on to the shafts 24 and 25 respectively.

The shaft 25 carries a pulley 26 keyed thereon, which is connected by a suitable belt drive 27 to a motorised pulley 28 coupled to an electric motor 29.

Various cross members 30 are situated on the chains 21 (see FIG. 1), each containing two cone frustum cavities 31 with open bottoms.

The cones 32 with their ice cream material are collected in the cavities 31 at the discharge station.

The pitch and distance apart of the cavities 31 coincide with those of the cavities 11 in the moulds, so that a convenient portion of the chains 21 lies below the discharge station in a position able to receive a number of cones 32 equal to the number of ice cream products to be discharged.

The chains 21 are driven by the successive starting and stopping of the motor 29 controlled by suitable contact means, not shown in the figure and of usual form, which cause a number of empty cavities 31 equal to the number of mould cavities 11 to be discharged in the discharge station, to be brought in succession under said station.

A device 34 may be provided downstream of the discharge station laterally to the pair of chains 1, to allow a powder, for example of cocoa or other decorative mateial, to fall on to the already formed ice cream cones.

The description of the means for withdrawing the cones from the chains 21 is omitted, as they are of usual type.

Figure 11:
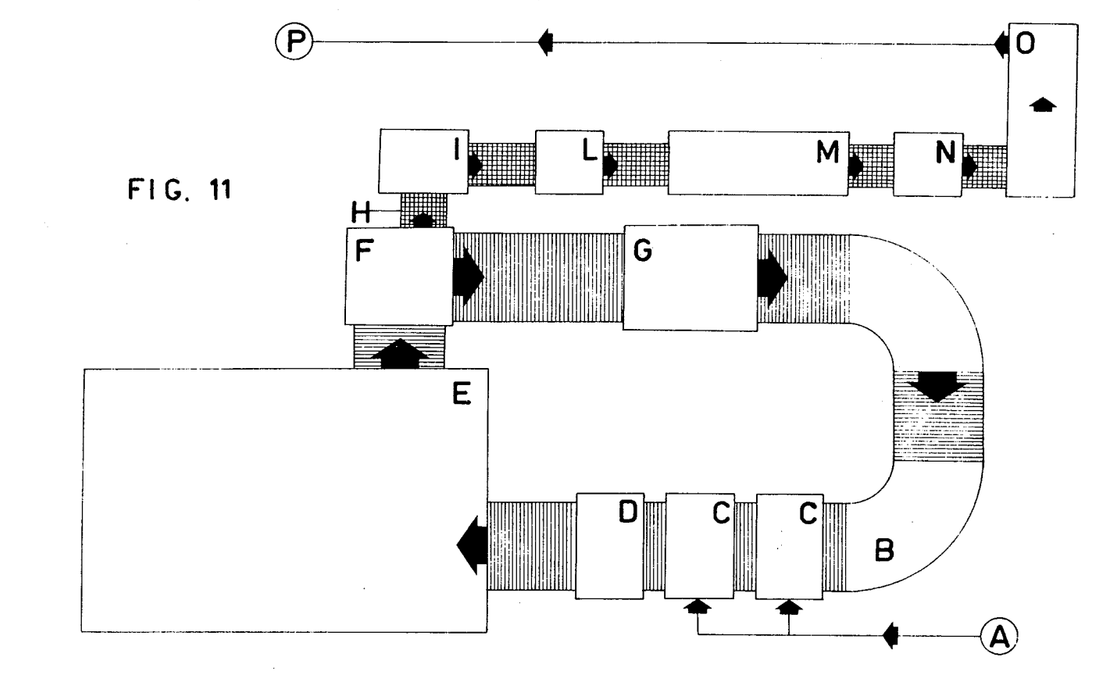
FIG. 11 is a diagrammatic plan view of an ice cream manufacturing plant.

FIG. 11 shows a general flow diagram for an automatic plant for carrying out the process according to the invention.

In this diagram:

A indicates the feed of the raw materials for the plant.
B indicates the moulds in motion.
C indicates the state in which the raw materials are fed into the moulds.
D indicates the stage in which sticks or other savoury materials are inserted into the product.
E indicates the low temperature hardening stage.
F indicates the product release stage, by pressure exerted on the base of the mould.
G indicates the mould resetting stage, by a thrust in the opposite direction to the preceding (letter F).
H indicates the conveyor belt which conveys the products to the successive stages.
I indicates the stage in which the product is coated with chocolate or other ingredients.
L indicates the stage in which the product is given a granulated finish with edible granulates.
M indicates the wrapping stage for the finished product.
N indicates the stage in which the product is packaged into a box.
O indicates the stage in which the boxes containing the final product are closed by a tape.
P indicates the passage of the boxes to the final product store.

The invention is not limited to the single embodiment heretofore described, and modifications and improvements may be made to it without leaving the scope of the invention, the fundamental characteristics of which are summarised in the following claims.

What is claimed is:

1. Process for manufacturing ice cream of the type consisting of a hardened creamy mass and in which a support stick is embedded, comprising the following operations in succession:

feeding one or more different types of creamy material by known proportioning devices into suitable deformable elastomer recesses, inserting a stick into said recesses in succession, introducing said recesses into a chamber at very low temperature of the order of 40°- 45° C below zero, for a time of approximately 40 - 46 minutes;

withdrawing said recesses from said chamber and feeding them inverted to a suitable discharge station;

deforming said recesses by acting on them externally from above with a suitable pressure to make them assume an inverted symmetrical configuration, with the consequent expulsion of the hardened creamy mass;

subsequently deforming said recess in the opposite direction to make them assume their initial configuration.

2. Process for manufacturing ice cream of the type consisting of a hardened creamy mass and which is supported and stably fixed at the top of a hollow cone of edible biscuit material, comprising the following operations in succession:

feeding one or more different types of creamy material by known proportioning devices into suitable deformable elastomer recesses;

making a hollow cone of edible biscuit material fall onto said recesses;

introducing said recesses into a chamber at very low temperature of the order of 40°- 45° C below zero, for a time of approximately 40 - 46 minutes;

withdrawing said recesses from said chamber and feeding them inverted to a suitable discharge station;

deforming said recesses by acting on them externally from above with a suitable pressure to make them assume an inverted symmetrical configuration, with the consequent expulsion of the hardened creamy mass;

subsequently deforming said recesses in the opposite direction to make them assume their initial configuration.

3. Automatic machine for manufacturing blocks of ice cream and the like comprising a refrigerated chamber, a conveyor which travels along part of its path of travel in the open air and part of said path within said chamber, transverse members on said conveyor, each consisting of a plate of elastomeric material defining recesses having walls thinner than said plate, feed means for a creamy material, spray means for material in aqueous suspension and feeder means for a wooden stick or cone of edible material upstream of said refrigerated chamber, and means located on opposite sides of said conveyor downstream of the refrigerated chamber for causing said recesses to assume an inverted configuration symmetrical with respect to their initial configuratiion and then returning them to their initial configuration.

4. Automatic machine for manufacturing blocks of ice cream and the like comprising a refrigerated chamber, a conveyor which travels along part of its path of travel in the open air and part of said path within said chamber, transverse members on said conveyor, each consisting of a plate of elastomeric material defining recesses having walls thinner than said plate, means located on opposite sides of said conveyor downstream of the refrigerated chamber for causing said recesses to assume an inverted configuration symmetrical with respect to their initial configuration and then returning them to their initial configuration and a transverse conveyor below the means for causing said elastomeric recesses to assume an inverted configuration, said transverse conveyor comprising cavities into which said means cause said blocks to fall when said recesses are deformed.

* * * * *